G. R. THOMPSON.
PISTON PACKING.
APPLICATION FILED DEC. 9, 1908.
927,190.
Patented July 6, 1909.
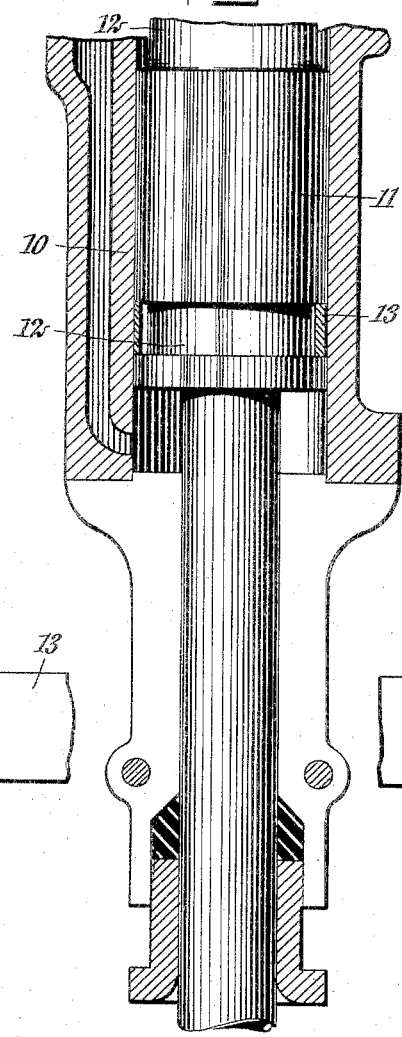
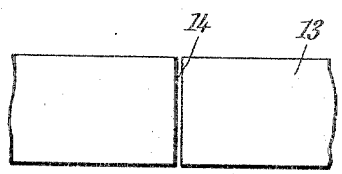
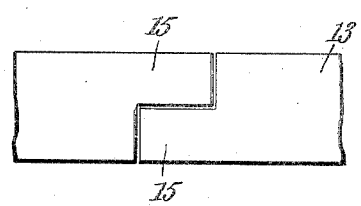
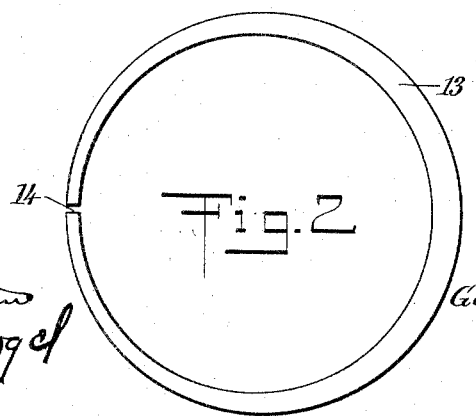
WITNESSES
INVENTOR
George R. Thompson
BY
ATTORNEYS

UNITED STATES PATENT OFFICE.

GEORGE ROBERT THOMPSON, OF REPUBLIC, MICHIGAN, ASSIGNOR TO MARTHA THOMPSON, OF REPUBLIC, MICHIGAN.

PISTON-PACKING.

No. 927,190.  Specification of Letters Patent.  Patented July 6, 1909.

Application filed December 9, 1908. Serial No. 466,674.

*To all whom it may concern:*

Be it known that I, GEORGE ROBERT THOMPSON, a citizen of the United States, and a resident of Republic, in the county of Marquette and State of Michigan, have invented a new and Improved Piston-Packing, of which the following is a full, clear, and exact description.

This invention relates to piston packing for air cylinders, and relates more particularly to a packing ring fashioned from hard fiber generally, known as indurated or vulcanized fiber, and split so that it can be sprung upon the piston, the ring tending to spread against the walls of the cylinder, owing to its own normal resiliency.

The object of the invention is to provide a simple, inexpensive and durable piston packing ring, which consists of a tough, non-metallic and resilient substance, so that it is particularly well adapted for use in air compressors, air drill cylinders and the like, which, when it is accidentally broken into fragments, will not score or otherwise injure the interior of the cylinder if the piston continues to operate, which tends to prevent leakage of air from one side of the piston to the other, and which even in small sizes can be easily sprung into place upon the piston.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section showing a part of a drill cylinder having a piston therein to which is applied an embodiment of my invention; Fig. 2 is a side elevation showing one form of the fiber ring; Fig. 3 is an enlarged plan view showing a part of a ring of modified form; and Fig. 4 is a similar view, showing a part of a ring of still further modified form.

Before proceeding to a more detailed explanation of my invention, it should be clearly understood that the piston ring which I employ is fashioned from vulcanized or indurated "fiber" which is tough, non-metallic, and sufficiently resilient to permit its being sprung even when the ring is of small diameter, upon the piston. It is thus adapted to replace cast-iron, for cast-iron rings of comparatively small diameter cannot be sprung into place without breaking them. The fiber ring is thus particularly well adapted for use with the small diameter pistons of air drills and the like. The cast iron ring, moreover, has a further disadvantage when used for drills and similar machines, owing to the fact that the shock of operation is apt to break it and the fragments, if the piston continues to operate, soon score and otherwise injure the interior of the cylinder. The fiber ring requires no springs to spread it against the walls of the cylinder, as its natural resiliency is sufficient for this purpose. Needless to say, the fiber is of sufficient hardness to wear well in connection with air drills and the like.

Referring more particularly to the drawings, 10 represents the cylinder of an air drill having a piston 11 therein. The piston has annular grooves 12 adapted to receive the piston packing rings. One form of the fiber ring which I employ is shown in Fig. 2. The ring 13 has the inner periphery eccentric with the outer periphery, so that the ring at one side is of greater thickness than at the other. At the thinner side, the ring has a split 14 so that it can be spread and sprung into position within one of the grooves 12. The split 14 may be straight, or as shown in Fig. 4, may be formed by oppositely disposed tongues 15 at the ends of the split ring, which form a lap joint. The lap joint is effective in preventing leakage from one side of the piston to the other.

Having thus described my invention, I claim as new, and desire to secure by Letters Patent:

1. A piston packing, comprising a ring fashioned from vulcanized or indurated fiber having a normal resiliency, whereby said ring tends to expand.

2. A piston packing, comprising a resilient ring fashioned from indurated fiber.

In testimony whereof I have signed my name to this specification, in the presence of two subscribing witnesses.

GEORGE ROBERT THOMPSON.

Witnesses:
 THOMAS CHENHALL,
 W. H. ROBERTS.